(12) United States Patent
Kii et al.

(10) Patent No.: US 6,667,106 B1
(45) Date of Patent: Dec. 23, 2003

(54) GEL COMPOSITION, PROCESS FOR THE PREPARATION OF THE GEL COMPOSITION, GEL ELECTROLYTE COMPOSITION COMPRISING THE GEL COMPOSITION PROCESS FOR THE PREPARATION OF THE GEL ELECTROLYTE COMPOSITION, AND SOLID ELECTROLYTE LAMINATE CONTAINING THE GEL ELECTROLYTE COMPOSITION

(75) Inventors: Keisuke Kii, Osaka (JP); Yoshihiro Uetani, Osaka (JP); Yutaka Yamamura, Osaka (JP)

(73) Assignee: Nitto Denko Corporation, Osaka (JP)

(*) Notice: Subject to any disclaimer, the term of this patent is extended or adjusted under 35 U.S.C. 154(b) by 0 days.

(21) Appl. No.: 09/348,051

(22) Filed: Jul. 6, 1999

(30) Foreign Application Priority Data

Jul. 7, 1998 (JP) .......................................... 10-191931

(51) Int. Cl.$^7$ ........................... B32B 27/00; H01M 6/14
(52) U.S. Cl. ....................... 428/480; 428/482; 428/500; 429/300; 429/306; 429/309; 264/621; 264/622; 252/62.2
(58) Field of Search ................................ 428/480, 482, 428/500; 429/300, 306, 309; 264/621, 622; 252/62.2

(56) References Cited

U.S. PATENT DOCUMENTS 5,426,008 A * 6/1995 Hagiwara et al. ............. 430/18
5,919,587 A * 7/1999 Mukherjee et al. .......... 429/213
6,103,425 A * 8/2000 Harada et al. ............... 429/303
6,238,821 B1 * 5/2001 Mukherjee et al. .......... 429/213

OTHER PUBLICATIONS

Kobunshi Kako (Polymer Processing), 45 (1), pp. 21–26 (1996).

J. Am. Chem. Soc. 1997, 119, pp. 12675–12676.

* cited by examiner

Primary Examiner—Monique R. Jackson
(74) Attorney, Agent, or Firm—Sughrue Mion, PLLC

(57) ABSTRACT

A gel composition comprising a reversible gelling agent, an irreversible gelling agent, an electrolyte salt and a solvent for the electrolyte salt; a preparation process for the gel composition which comprises a first step of heating a gel mixture of a reversible gelling agent, an irreversible gelling agent, an electrolyte salt and a solvent for the electrolyte salt to a first temperature region at which the reversible gelling agent functions, to transform the gel into sol and molding the sol into a desired shape; and a second step of heating the sol to a second temperature region at which the irreversible gelling agent functions, to gel irreversibly; and a gel electrolyte composition comprising the above-described gel composition and a process for the preparation thereof. The gel composition can be handled as a solid electrolyte, can be adhered closely with the surface of an electrode and can be used as an electrochemical element in a desired shape.

7 Claims, 1 Drawing Sheet

GEL COMPOSITION, PROCESS FOR THE PREPARATION OF THE GEL COMPOSITION, GEL ELECTROLYTE COMPOSITION COMPRISING THE GEL COMPOSITION PROCESS FOR THE PREPARATION OF THE GEL ELECTROLYTE COMPOSITION, AND SOLID ELECTROLYTE LAMINATE CONTAINING THE GEL ELECTROLYTE COMPOSITION

FIELD OF THE INVENTION

The present invention relates to a gel composition and use thereof. More specifically, the present invention relates to a gel composition which comprises a reversible gelling agent, an irreversible gelling agent, an electrolyte salt and a solvent for the electrolyte salt, wherein a first gel composition in which only the reversible gelling agent functions is reversible in the conversion between a gel and a solution and by functioning the irreversible gelling agent in the first gel composition, a second gel composition can be formed irreversibly; and a process for the preparation of the same.

The present invention also relates to a gel electrolyte composition comprising the gel composition, and a process for the preparation of the same.

The present invention further relates to a solid electrolyte laminate containing the gel electrolyte composition

BACKGROUND OF THE INVENTION

The term "solid electrolytes" means substances having high ion conductivity in a solid state. Of those substances, a high molecular weight solid electrolyte which uses a high molecular weight substance as a solid has recently attracted particular attentions as an electrolyte for lithium secondary batteries in the next generation and researches on it have been made briskly in the world.

Compared with the conventional electrolyte solution, such a high molecular weight solid electrolyte does not presumably cause liquid leakage and can be molded freely, for example, into a thin film. The conventional non-aqueous high molecular weight solid electrolyte is however accompanied with a problem such as a markedly low electrical conductivity compared with that of the electrolyte solution. For example, non-aqueous high molecular solid electrolytes obtained by complexing a polymer material such as a chain polymer (e.g., polyethylene glycol or polypropylene glycol) or a comb-type polymer such as polyphosphazene, with an electrolyte salt are conventionally known, but those having an electrical conductivity exceeding $10^{-3}$ S/cm at room temperature have not yet been found.

In recent days, practical use of various non-aqueous gel electrolytes has been studied and a non-aqueous gel electrolyte having an electrical conductivity of $10^{-3}$ S/cm or more, which is close to that of an electrolyte solution, has been proposed. Such a gel electrolyte is a material wherein an electrolyte salt is dissolved in a gel formed from a polymer material and a non-aqueous organic solvent, and can be obtained by dissolving the electrolyte salt, together with the polymer material or a precursor thereof, in the organic solvent and then solidifying (gelling) the resulting solution.

The conventional gel electrolytes however involve a problem that compared with an electrolyte solution, the contact with the surface of an electrode is poor, so that resistance between the gel electrolyte and the surface of the electrode is large. Such a large resistance between the gel electrolyte and the surface of the electrode prevents the effective use of the electrical conductivity which the gel electrolyte itself has, resulting in the impossibility of the practical use of it as an electrochemical element. Particularly when the electrode has not a flat surface, it is difficult to bring the conventional gel electrolyte into good contact with the surface of the electrode.

SUMMARY OF THE INVENTION

The present invention has been made to overcome the above-described problems of the conventional solid electrolyte.

Accordingly, one object of the present invention is to provide a novel gel composition useful as a solid electrolyte. Particularly, the object of the present invention is to provide a gel composition which can be treated as a solid electrolyte, can be adhered closely with the surface of an electrode and can be used as an electrochemical element in a desired form.

Another object of the present invention is to provide a process for the preparation of the gel composition.

Still another object of the present invention is to provide a gel electrolyte composition comprising the gel composition.

Further object of the present invention is to provide a process for the preparation of the gel electrolyte composition.

Still further object of the present invention is to provide a solid electrolyte laminate comprising the gel electrolyte composition.

The gel composition according to the present invention comprises a reversible gelling agent, an irreversible gelling agent, an electrolyte salt and a solvent for the electrolyte salt.

The process for the preparation of the gel composition according to the present invention comprises a first step of heating a gel mixture comprising a reversible gelling agent, an irreversible gelling agent, an electrolyte salt and a solvent for the electrolyte salt to a first temperature region at which the reversible gelling agent functions, to convert the gel mixture into the corresponding sol, and molding the sol into a desired shape; and a second step of heating the sol to a second temperature region at which the irreversible gelling agent functions, to irreversibly gel the sol.

The gel electrolyte composition according to the present invention comprises a reversible gelling agent, an irreversible gelling agent, an electrolyte salt and a solvent for the electrolyte salt.

The process for the preparation of the gel electrolyte composition according to the present invention comprises a first step of heating a gel mixture comprising a reversible gelling agent, an irreversible gelling agent, an electrolyte salt and a solvent for the electrolyte salt to a first temperature region at which the reversible gelling agent functions, to convert the gel mixture into the corresponding sol, and molding the sol into a desired shape; and a second step of heating the sol to a second temperature region at which the irreversible gelling agent functions, to irreversibly gel the sol.

The solid electrolyte laminate according to the present invention comprises a solid electrolyte thin film having a layer of the reversible sol-gel composition laminated on at least one surface thereof.

The gel composition according to the present invention is in the gel form at room temperature (e.g., 25° C.). By heating the gel composition to a first temperature region (for example, 40 to 70° C.), it can reversibly be converted into a sol. Accordingly, the gel composition of the present invention can be molded into a desired shape under the sol state of the first gel composition, and by gelling the sol, good contact with a substrate can be maintained. By heating such a first-stage gel composition to a second temperature region higher than the upper limit of the first temperature region, the first-stage gel composition can be gelled irreversibly, so that a stable shape can be maintained while maintaining the good contact with the substrate.

Similarly, the gel electrolyte composition of the present invention can be adhered closely to the surface of an electrode even when the surface is not flat, by converting the electrolyte composition into a sol and laying it closely along the surface. The shape can be maintained stably by gelling it irreversibly. In addition, the electrolyte gel composition of the present invention has a high electrical conductivity.

Since the solid electrolyte laminate according to the present invention has a layer of the above-described gel electrolyte composition as an interface layer, it can also be adhered closely onto the surface of an electrode by utilizing the reversible sold-gel transformation. By the irreversible gelation, its shape can be maintained stably.

The reversible sol-gel type electrolyte composition or solid electrolyte laminate according to the present invention and also an electrochemical element containing it can therefore be used advantageously as, for example, a solid electrolyte in a lithium secondary battery.

Figure 1:
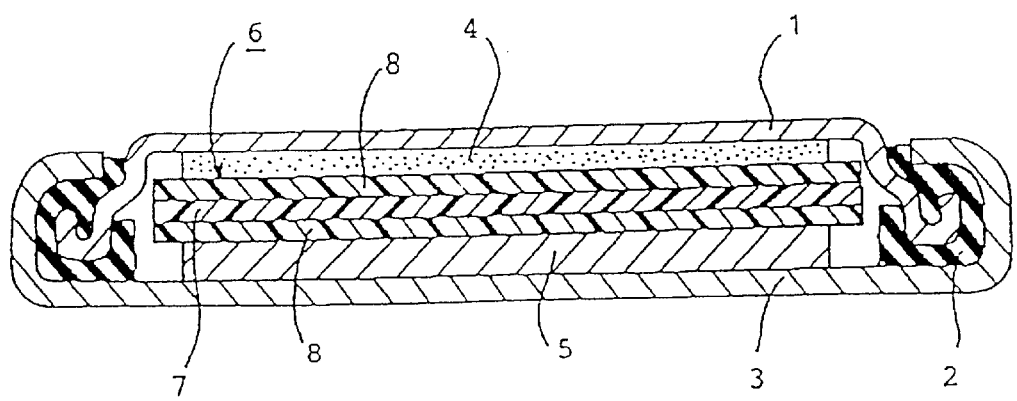
FIG. 1 is a longitudinal cross-sectional view of a coin-shaped solid electrolyte secondary battery.

In the drawings:
1: Positive electrode can which also serves as a positive electrode terminal
2: Insulator
3: Negative 3 electrode can which also serves as a negative electrode terminal
4: Positive electrode
5: Negative electrode
6: Solid electrolyte laminate
7: Solid electrolyte thin film
8: Layer of reversible sol-gel type electrolyte composition (interface layer)

DETAILED DESCRIPTION OF THE INVENTION

The term "reversible gelling agent" as used herein means a substance which forms a uniform solution when a composition obtained by blending it with a solution of a non-aqueous organic solvent having an electrolyte salt dissolved therein is heated to a first temperature region higher than room temperature (25° C.), for example but not limited thereto, 40 to 70° C., and reversibly forms a gel composition (first-stage gel composition) when this solution is cooled to room temperature (25° C.). In principle, it means a substance which can conduct association and dissociation, or mobilization and immobilization reversibly according to the variation of temperature, pressure or the like. Useful substance is, for example, a substance which can carry out association and dissociation, or mobilization and immobilization reversibly by intermolecular or intramolecular action, such as hydrogen bond, coordinate bond or van der Waals force.

According to the present invention, preferred examples of the reversible gelling agent include polymers or oligomers each of which is soluble in a solvent within the first temperature region higher than room temperature (25° C.) but solidifies at room temperature and reversibly forms a gel composition, particularly polymers or oligomers each having in a molecule thereof a polar group such as ether group or hydroxyl group; and a group of substances known as an oil gelling agent.

Examples of the polymer having in a molecule thereof a polar group such as ether group or hydroxyl group include polyethylene glycol, polypropylene glycol, polyethylene propylene glycol and polyvinyl alcohol.

The oil gelling agent is a chemical which can solidify the whole oil into a gel by the addition thereof in a small amount as, for example, described in "Kobunshi Kako (Polymer Processing), 45(1), 21–26(1996)". Various kinds of the oil gelling agent are already known.

In the present invention, no particular limitation is posed on the oil gelling agent insofar as it is known as an oil gelling agent, and any oil gelling agent can be used. Preferred specific examples thereof include 12-hydroxystearic acid, N-lauroyl-L-glutamic acid-α,γ-bis-n-butylamide, 1,2,3,4-dibenzylidene-D-sorbitol, aluminum dialkylphosphate, 2,3-bis-n-hexadecyloxyanthracene, trialkyl-cis-1,3,5-cyclohexanetricarboxyamide, cholesterol derivatives represented by the following formulas:

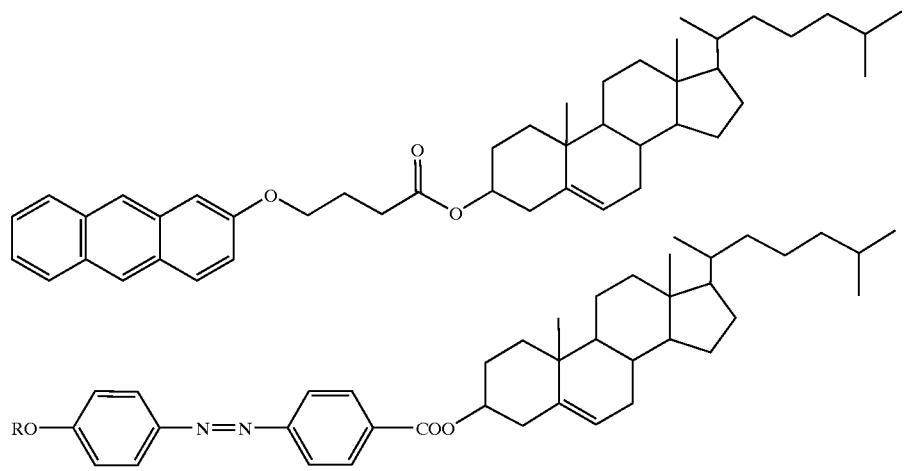

and cyclohexanediamine derivatives represented by the following formulas:

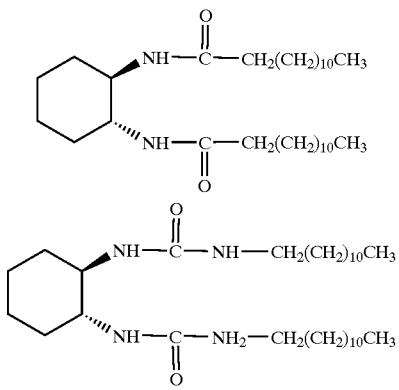

On the other hand, the term "irreversible gelling agent" as used herein means a substance which irreversibly gels a first-stage gel composition when a composition obtained by blending the irreversible gelling agent with a solution of a non-aqueous organic solvent having an electrolyte salt dissolved therein is heated to a second temperature region higher than the upper limit of the above-described first temperature region, for example but not limited thereto, exceeding 70° C. but 100° C. or lower. In principle, useful substance is a substance which permits chemical bonding by the action of temperature, pressure, light, polymerization initiator or the like, and after removal of the action, maintains the bonding and does not permit reversible conversion into a sol.

In the present invention, a polymer which carries out polymerization and crosslinking in the above-described second temperature region, for example, a polyfunctional polymer (meth)acrylate having a (meth)acrylate group at both ends of the molecule, is particularly preferably used. Specific examples thereof include polyalkylene di(meth)acrylates such as polyethylene glycol di(meth)acrylate, polypropylene glycol di(meth)acrylate and polyethylene propylene glycol di(meth)acrylate.

Examples of the electrolyte salt used in the present invention include salts containing, as a cationic component, an hydrogen ion, an ion of an alkali metal such as lithium, sodium or potassium, an ion of an alkaline earth metal such as calcium or strontium, or a tertiary or quaternary ammonium ion and, as an anionic component, an inorganic acid such as hydrochloric acid, nitric acid, phosphoric acid, sulfuric acid, tetrafluoroboric acid, hydrofluoric acid, hexafluorophosphoric acid or perchloric acid, or an organic acid such as organic carboxylic acid, fluorine-substituted organic carboxylic acid, organic sulfonic acid or fluorine-substituted organic sulfonic acid. Of those, electrolyte salts containing as a cationic component an alkali metal ion are preferably used.

Specific examples of such an electrolyte salt containing an alkali metal ion as a cationic component include alkali metal perchlorates such as lithium perchlorate, sodium perchlorate and potassium perchlorate; alkali metal tetrafluoroborates such as lithium tetrafluoroborate, sodium tetrafluoroborate and potassium tetrafluoroborate, alkali metal hexafluorophosphates such as lithium hexafluorophosphate and potassium hexafluorophosphate, alkali metal trifluoroacetates such as lithium trifluoroacetate and alkali metal trifluoromethanesulfonates such as lithium trifluoromethanesulfonate.

In the present invention, the non-aqueous organic solvent for the electrolyte salt is appropriately selected without particular limitation insofar as it dissolves therein the electrolyte salt used. Examples thereof include cyclic esters such as ethylene carbonate, propylene carbonate, butylene carbonate and γ-butylolactone; ethers such as tetrahydrofuran and dimethoxyethane; chain esters such as dimethyl carbonate, diethyl carbonate and ethylmethyl carbonate. Those can be used alone or as mixtures thereof.

In the present invention, the amount of the reversible gelling agent is appropriately determined depending on not only the nature thereof but also the electrolyte salt or solvent used such that the mixture of them can form the first-stage gel composition. The amount thereof usually falls within a range of 0.1 to 10% by weight based on the weight of the gel composition obtained. The amount of the irreversible gelling agent is also appropriately determined depending on not only the nature thereof but also the electrolyte salt or solvent used such that the mixture of them can form a second-stage gel composition. The amount thereof usually falls within a range of 1 to 50% by weight based on the weight of the resulting gel composition.

On the other hand, the amount of the electrolyte salt is appropriately determined depending on not only the nature thereof but also the reversible gelling agent or solvent used. The amount thereof usually falls within a range of from 1 to 20% by weight based on the weight of the resulting gel composition.

The gel composition of the present invention comprises the above-described solvent, electrolyte salt, reversible gelling agent and irreversible gelling agent, and can advantageously be used in preparing a molded product comprising such a gel composition.

According to the present invention, a uniform solution (sol) can be obtained by adding the electrolyte salt, reversible gelling agent and irreversible gelling agent to the above-described solvent and stirring the resulting mixture under heating to the first temperature region of, for example, 40 to 70° C. By cooling the uniform solution to room temperature (25° C.), a first-stage gel composition can be obtained. This first-stage gel composition is in the form of a gel at room temperature (25° C.), and can be converted into a sol by heating the same to the first temperature region of about 40 to 70° C. Such a change between the sol and gel is reversible.

By utilizing the reversible sol-gel transformation of the first-stage gel composition, the gel composition according to the present invention can be molded into a predetermined shape when it is in the form of a sol. If necessary, by reversibly gelling the composition in the form of a sol, the shape of the composition can be fixed as a gel which can be reversibly converted into a sol.

In the present invention, however, the first-stage gel composition can be gelled irreversibly if it is molded in the form of a sol and the sol is then heated to a second temperature region higher than the upper limit of the first temperature region.

According to the present invention, after the first-stage gel composition is molded in the form of a sol, cooled and then gelled, it can be converted again into a sol and then subjected to deformation or molding, if necessary. When deformation or molding finally becomes unnecessary, it is possible to irreversibly gel the gel composition and irreversibly fix the finally selected shape.

According to the present invention, it is possible to insert in the gel composition a core material such as non-woven fabric, porous film or mesh. Such a gel composition having the core material therein can be prepared by, for example, transforming the first gel composition into sol and cooling and gelling while immersing the core material in the sol.

The gel composition of the present invention is obtained by blending a reversible gelling agent and irreversible gelling agent with an electrolyte solution comprising a non-aqueous organic solvent of an electrolyte salt, so that it is particularly useful as a gel electrolyte composition.

For example, such a gel electrolyte composition, when used as a solid electrolyte in a battery, permits good adhesion with the surface of the electrode even if the surface is not flat, by being transformed into a sol, closely laid along the surface of the electrode and then gelled. By the subsequent irreversible gelation, a stable shape and good contact can be maintained.

According to the present invention, it is also possible to prepare a solid electrolyte laminate having, as an interface layer, a gel composition (gel electrolyte composition) layer on at least one surface of a solid electrolyte thin film by applying the gel composition (electrolyte gel composition) of the present invention in a sol form to at least one surface of the solid electrolyte thin film, followed by cooling to cause gelation. Such a solid electrolyte laminate is preferably a thin film.

In such a solid electrolyte laminate, any conventional solid electrolytes can be used as a solid electrolyte. In addition, the conventional gel electrolytes can also be used as a solid electrolyte. Examples of such a solid electrolyte include lithium iodide, lithium iodide (alumina) and $Li_xS_yP_zO$, and also include those obtained by dissolving an electrolyte salt in a polymer material such as polyethylene glycol, polypropylene glycol, polyacrylonitrile, polyphosphazene or polysiloxane.

Examples of the gel solid electrolyte include those obtained by crosslinking and curing a polymer material such as a copolymer having in its side chain polyethylene glycol, polypropylene glycol, polyvinylidene fluoride, polyacrylonitrile, polymethacrylate, poly(meth)acrylic acid oligoethylene oxide, polyethylene imine, polyalkylene sulfide or oligoethylene oxide; dissolving therein an electrolyte salt and gelling the resulting solution; and if necessary, adding a plasticizer to the resulting gel.

For example, the gel solid electrolyte can be obtained by dissolving an electrolyte salt in a non-aqueous organic solvent, adding polyethylene propylene glycol diacrylate and a polymerization initiator to the resulting solution to dissolve those therein, and heating the solution, thereby crosslinking polyethylene propylene glycol diacrylate.

Even if the surface of a battery is not flat, if an interface layer comprising the gel electrolyte composition layer is used so as to contact with the surface of the electrode, such a solid electrolyte laminate can be adhered closely to the surface of the battery by transforming a reversible sol-gel state electrolyte composition into sol, laying the sol closely along the surface of the battery and then transforming the sol into gel.

The reversible sol-gel electrolyte composition or solid electrolyte laminate according to the present invention can preferably be used as, for example, a solid electrolyte for lithium secondary battery as described above.

FIG. 1 is a longitudinal cross-sectional view of a coin-shaped lithium secondary battery which uses such a solid electrolyte. In this lithium secondary battery, a positive electrode can 1 which also serves as a positive electrode terminal is made of, for example, a nickel-plated stainless steel plate and is combined, via an insulator 2, with a negative electrode can 3 which also serves as a negative electrode terminal and is insulated from the positive electrode can, thus constituting a container for the battery. The negative electrode can also be made of, for example, a nickel-plated stainless steel plate.

Inside of the container having such a constitution, the positive electrode 4 is disposed in contact with the positive electrode can. The positive electrode 4 can be obtained by, for example, mixing the positive electrode active substance such as a lithium-manganese complex oxide and a conductive substance such as graphite with a binding resin such as polyethylene, polypropylene or polytetrafluoroethylene and then molding the resulting mixture under pressure. Similarly, a negative electrode 5 is disposed in contact with the negative electrode can. The negative electrode is made of, for example, a lithium plate.

Between these positive and negative electrodes, a solid electrolyte laminate 6 of the present invention is disposed and they constitute a battery. The solid electrolyte laminate 6 has a layer 8 of a reversible sol-gel state electrolyte composition on both surfaces of a solid electrolyte thin film 7 as interface layers. These interface layers are in contact with the positive and negative electrodes, respectively.

The present invention will be described in detail below by reference to the following examples, but it should be understood that the present invention is not limited thereto.

EXAMPLE 1

An electrolyte solution was prepared using as a solvent a mixture of 36.6 g of ethylene carbonate and 55.6 g of ethylmethyl carbonate and dissolving therein 7.8 g of lithium tetrafluoroborate as an electrolyte salt. 0.81 g of 12-hydroxystearic acid as a reversible gelling agent, 5.00 g of polyethylene propylene glycol diacrylate as an irreversible gelling agent and 0.05 g of 2,2'-azobisisobutylonitrile as a polymerization initiator were mixed with 14.06 g of the resulting electrolyte solution, followed by stirring under heating to 50° C., whereby a uniform transparent solution was obtained.

The resulting solution was spread on a glass plate having spacers disposed at both ends thereof for controlling the thickness of the solution, followed by cooling to room temperature, whereby a white gel composition having a thickness of about 200 μm (first-stage gel composition) was obtained. The resulting gel composition returned to the transparent solution by heating to about 50° C. on a hot plate. Namely, in the first-stage gel composition, the sol-gel transformation was reversible.

The first-stage gel composition was then heated to 90° C. at which heating was continued for 2 hours. For a while after heating was started, the first-stage gel composition remained as a uniform solution similar to that obtained by heating to 50° C. After completion of the heating, however, it lost its fluidity and became a gel, although still being transparent. By cooling to room temperature, the resulting transparent gel changed to a white gel having a thickness of about 200 μm (second-stage gel composition).

When the resulting white second-stage gel composition was heated to about 50° C. on a hot plate, it became transparent again but was not transformed into a solution and still remained in the form of a gel. It was not transformed into a solution and remained in the form of a gel even by heating to about 90° C.

In short, the transformation from the first-stage gel composition to the second-stage gel composition was irreversible. The second-stage gel composition thus obtained was self-supporting and could be treated easily by forceps.

A thin film of the second-stage gel composition was inserted between stainless plates, followed by contacting with an impedance analyzer. When measured at 25° C. with a complex impedance method, its electrical conductivity was found to be $1.0 \times 10^{-3}$ S/cm.

COMPARATIVE EXAMPLE 1

Electrolyte Solution

An electrolyte solution was prepared using as a solvent a mixture of 36.6 g of ethylene carbonate and 55.6 g of ethylmethyl carbonate and dissolving therein 7.8 g of lithium tetrafluoroborate as an electrolyte salt.

When the electrical conductivity of the resulting electrolyte solution was measured in the same manner as in Example 1, it was found to be $3.6 \times 10^{-3}$ S/cm at 25° C. When measured with a direct-current four-terminal method metal lithium as an electrode, the electrical conductivity was found to be $2.5 \times 10^{-3}$ S/cm at 25° C.

EXAMPLE 2

An electrolyte solution was prepared using as a solvent a mixture of 36.6 g of ethylene carbonate and 55.6 g of ethylmethyl carbonate and dissolving therein 7.8 g of lithium tetrafluoroborate as an electrolyte salt. 2.43 g of polyethylene glycol as a reversible gelling agent, 5.00 g of polyethylene propylene glycol diacrylate as an irreversible gelling agent and 0.05 g of 2,2'-azobisisobutylonitirle as a polymerization initiator were mixed with 14.06 g of the resulting electrolyte solution, followed by stirring under heating to 65° C., whereby a uniform transparent solution was obtained.

The resulting solution was spread on a glass plate having spacers disposed at both ends thereof for controlling the thickness of the solution, followed by cooling to room temperature, whereby a white gel composition having a thickness of about 200 μm (first-stage gel composition) was obtained. The resulting gel composition returned to the transparent solution by heating to about 65° C. on a hot plate. Namely, in the first-stage gel composition, the sol-gel transformation was reversible.

The first-stage gel composition was then heated to 90° C. at which heating was continued for 2 hours. For a while after heating was started, the first-stage gel composition remained as a uniform solution as the same as that obtained by heating to 65° C. After completion of the heating, however, it lost its fluidity and became a gel, although still being transparent. By cooling to room temperature, the resulting transparent gel changed to a white gel having a thickness of about 200 μm (second-stage gel composition).

When the resulting white second-stage gel composition was heated to about 50° C. on a hot plate, it became transparent again, but was not transformed into a solution and still remained in the form of a gel. It was not transformed into a solution and remained in the form of a gel even by heating to about 90° C.

In short, the transformation from the first-stage gel composition to the second-stage gel composition was irreversible. The second-stage gel composition thus obtained was self-supporting and could be treated easily by forceps.

A thin film of the second-stage gel composition was inserted between stainless plates, followed by contacting with an impedance analyzer. When measured at 25° C. with a complex impedance method, its electrical conductivity was found to be $8.5 \times 10^{-4}$ S/cm.

While the invention has been described in detail and with reference to specific examples thereof, it will be apparent to one skilled in the art that various changes and modifications can be made therein without departing from the spirit and scope thereof.

What is claimed is:

1. A gel electrolyte composition, which comprises a reversible gelling agent, an irreversible gelling agent, an electrolyte salt and a solvent for the electrolyte salt, wherein said reversible gelling agent is a substance which forms a uniform solution of an electrolyte solution comprising the electrolyte salt and the solvent for the electrolyte salt at a first temperature region of from 40 to 70° C., and reversibly forms a gel composition when the uniform solution is cooled to room temperature, and said irreversible gelling agent is a substance which irreversibly gels an electrolyte solution comprising the electrolyte salt and the solvent for the electrolyte salt at a second temperature region of from higher than 70 to 100° C.

2. The gel electrolyte composition as claimed in claim 1, wherein the reversible gelling agent is an oil gelling agent.

3. The gel electrolyte composition as claimed in claim 1, wherein the reversible gelling agent is 12-hydroxystearic acid.

4. The gel electrolyte gel composition as claimed in claim 1, wherein the irreversible gelling agent is a polyalkylene glycol di(meth)acrylate.

5. A process for the preparation of the gel electrolyte composition claimed in claim 1, which comprises a first step of heating a gel mixture comprising a reversible gelling agent, an irreversible gelling agent, an electrolyte salt and a solvent for the electrolyte salt to a first temperature region of from 40° C. to 70° C. at which said reversible gelling agent functions, to convert the gel mixture into the corresponding sol and molding the sol into a desired shape; and a second step of heating the sol to a second temperature region of from higher than 70° C. to 100° C. at which said irreversible gelling agent functions, to irreversibly gel the sol.

6. A solid electrolyte laminate, which comprises a solid electrolyte thin-film having a layer of a gel electrolyte composition as claimed in claim 1 laminated on at least one surface thereof.

7. An electrochemical element comprising a gel electrolyte composition as claimed in claim 1.

* * * * *